(12) United States Patent
Lin

(10) Patent No.: US 7,990,886 B2
(45) Date of Patent: Aug. 2, 2011

(54) NETWORK DEVICE AND CONNECTION DETECTION METHOD THEREOF

(75) Inventor: Wen-Kuang Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 155 days.

(21) Appl. No.: 12/510,174

(22) Filed: Jul. 27, 2009

(65) Prior Publication Data

US 2010/0254273 A1 Oct. 7, 2010

(30) Foreign Application Priority Data

Apr. 7, 2009 (CN) .......................... 2009 1 0301374

(51) Int. Cl.
*G01R 31/08* (2006.01)
(52) U.S. Cl. ........................ 370/252; 370/248
(58) Field of Classification Search ................. 370/242, 370/243, 244, 245, 248, 252
See application file for complete search history.

(56) References Cited

U.S. PATENT DOCUMENTS

| 6,289,461 | B1 * | 9/2001 | Dixon ............................. 726/11 |
| 6,718,282 | B1 * | 4/2004 | Xu et al. ....................... 702/182 |
| 6,976,071 | B1 * | 12/2005 | Donzis et al. ................. 709/224 |
| 7,058,703 | B2 * | 6/2006 | Hawkins ....................... 709/220 |
| 7,636,313 | B2 * | 12/2009 | Sethi et al. .................... 370/236 |
| 2003/0112749 | A1 * | 6/2003 | Hassink et al. ............... 370/225 |
| 2008/0298263 | A1 | 12/2008 | Yamada et al. |
| 2009/0180489 | A1 * | 7/2009 | Fujita et al. .................. 370/409 |

* cited by examiner

*Primary Examiner* — Ricky Ngo
*Assistant Examiner* — Christine Ng
(74) *Attorney, Agent, or Firm* — Raymond J. Chew

(57) ABSTRACT

A network device records a number of data packets transmitted between a partner network device and the network device in a detection cycle. According to the number of detection packets without corresponding response packets number at the end the detection cycle, and the number of unchanged of data packets when the number of the detection packets without corresponding response packets is not less than the preset value, the network device determines a connection status of the partner network device.

13 Claims, 2 Drawing Sheets

NETWORK DEVICE AND CONNECTION DETECTION METHOD THEREOF

BACKGROUND

1. Technical Field

The present disclosure relates to network communications, and more particularly to a network device and connection detection method thereof.

2. Description of Related Art

A network device that communicates with other network devices via the point to point protocol (PPP) frequently detects connections using link control protocol (LCP) echo requests and LCP echo replies. In detail, a network device that communicates with a partner network device via PPP, periodically sends LCP echo requests to the partner network device. The partner device returns one LCP echo reply corresponding to each of the LCP echo requests to the network device and the LCP echo reply is lost if the network device has not received it. The network device determines that the PPP is disconnected if lost LCP echo events exceed a predetermined number.

However, the LCP echo requests and the LCP echo replies may be lost due to instability of the network communication. Therefore, the network device may wrongly determine that PPP has been disconnected, which results in unnecessary disruption of the PPP connection.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
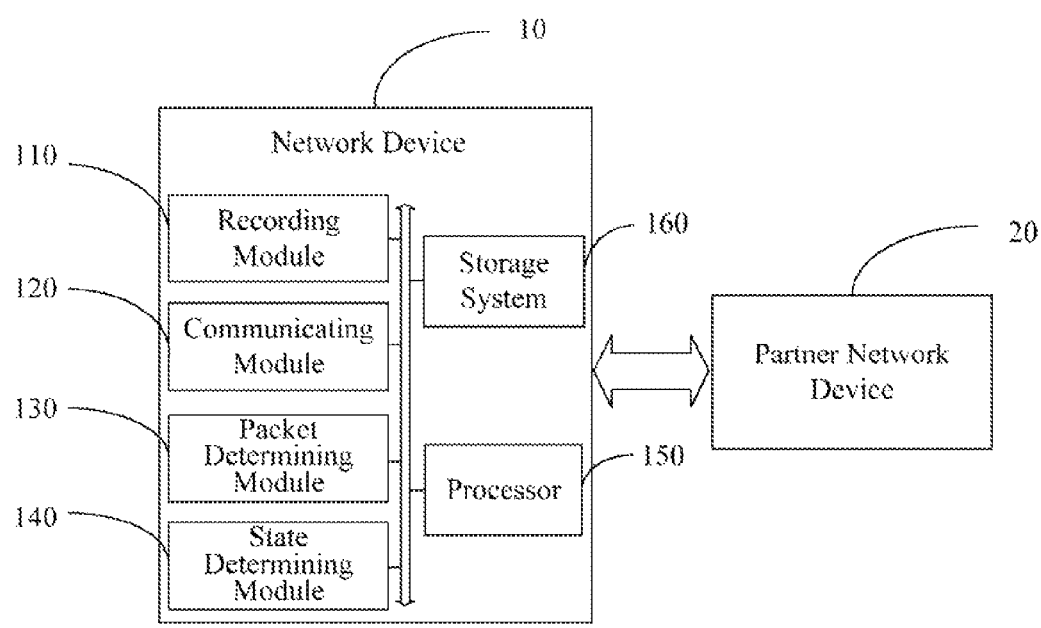
FIG. 1 shows an application environment and schematic diagram of functional modules of a network device of the present disclosure.

FIG. 1 shows an application environment and schematic diagram of functional modules of a network device 10 of the present disclosure. The network device 10 communicates with a partner network device 20 by use of data packets according to the point to point protocol (PPP). The network device 10 may be a server, the partner network device 20 may be a personal computer, and the PPP connection therebetween can be determined as follows.

As shown, network device 10 includes a recording module 110, a communication module 120, a packet determination module 130, a determination module 140, at least one processor 150, and a storage system 160. The modules 110-140 may include one or more computerized instructions stored in the storage system 160 and executed by the at least one processor 150.

The recording module 110 records a number of data packets transmitted between the network device 10 and the partner network device 20 via the PPP connection. The number of data packets recorded by the recording module 110 at the beginning of a detection cycle is defined as a first packet number, and the number of data packets recorded by the recording module 110 at the conclusion of the detection cycle is defined as a second packet number. In one embodiment, the detection cycle may be predetermined, such as 3, 6, or 9 seconds.

The communication module 120 transmits detection packets to the partner network device 20, and receives response packets corresponding to the detection packets from the partner network device 20 in a detection cycle. The recording module 110 further records the number of detection packets received without receiving corresponding response packets. The detection packet can be a link control protocol (LCP) echo request packet, and the response packet can be a LCP echo reply packet.

In one embodiment, the communication module 120 sends the data packets to the partner network device 20 for communication, and the detection packets for detecting the connection state. The partner network device 20 returns the response packets corresponding to the detection packets. Practically, the communication module 120 neither receives the response packets nor sends detection packets to the partner network device 20 due to instability of the PPP communication.

The packet determination module 130 determines whether the number of detection packets without corresponding response packets is less than a preset value at the end of the detection cycle. The recording module 110 records the second packet number of data packets transmitted between the network device 10 and the partner network device 20 when the number of the detection packets without corresponding response packets exceeds or equals the preset value. The communication module 120 further determines if the second packet number is equal to the first packet number if the number of the detection packets without corresponding response packets. The packet determination module 130 determines if the second packet number is equal to the first packet number when the number of the detection packets without corresponding response packets exceeds or equals the preset value. In one embodiment, the recording module 110 sets the preset value as a reference value in order to promptly detect the PPP connection between the network device 10 and the partner network device 20. The preset value can be set as 3, for example. In one embodiment, the packet determination module 130 determines if the number of the detection packets without corresponding response packets is equal to zero when the number of the detection packets without corresponding response packets is less than the preset value. At the same time the communication module 120 enters another detection cycle and sends the detection packets to the partner network device 20 for detection when the number of the detection packets without corresponding response packets is not equal to zero.

In one embodiment, the communication module 120 continues to determine if the network device 10 receives the response packets before the end of detection cycle. The recording module 110 further subtracts the number of the detection packets without corresponding response packets when the communication module 120 receives the response packets The determination module 140 is operable to determine the PPP connection between the network device 10 and the partner network device 20. In one embodiment, the determination module 140 determines that the network device 10 is disconnected from the partner network device 20 when the second packet number is equal to the first packet number. In one embodiment, the determination module 140 is further operable to determine that the network device 10 is connected with the partner network device 20 when the second packet number is not equal to the first packet number or the number of the detection packets without corresponding response packets is equal to zero. The recording module 110 sets the number of the detection packets without corresponding response packets as zero and restarts to record the first packet number over again.

In this disclosure, even though the detection packets and the response packet may be lost due to the instability of the network communication, the determination module 140 determines that the network device 10 is connected to the partner network device 20 when the number of data packets which the communication module 120 receives is changed. In this way, the network device 10 can decrease mischaracterization of the connection, and further improves detection efficiency.

Figure 2:
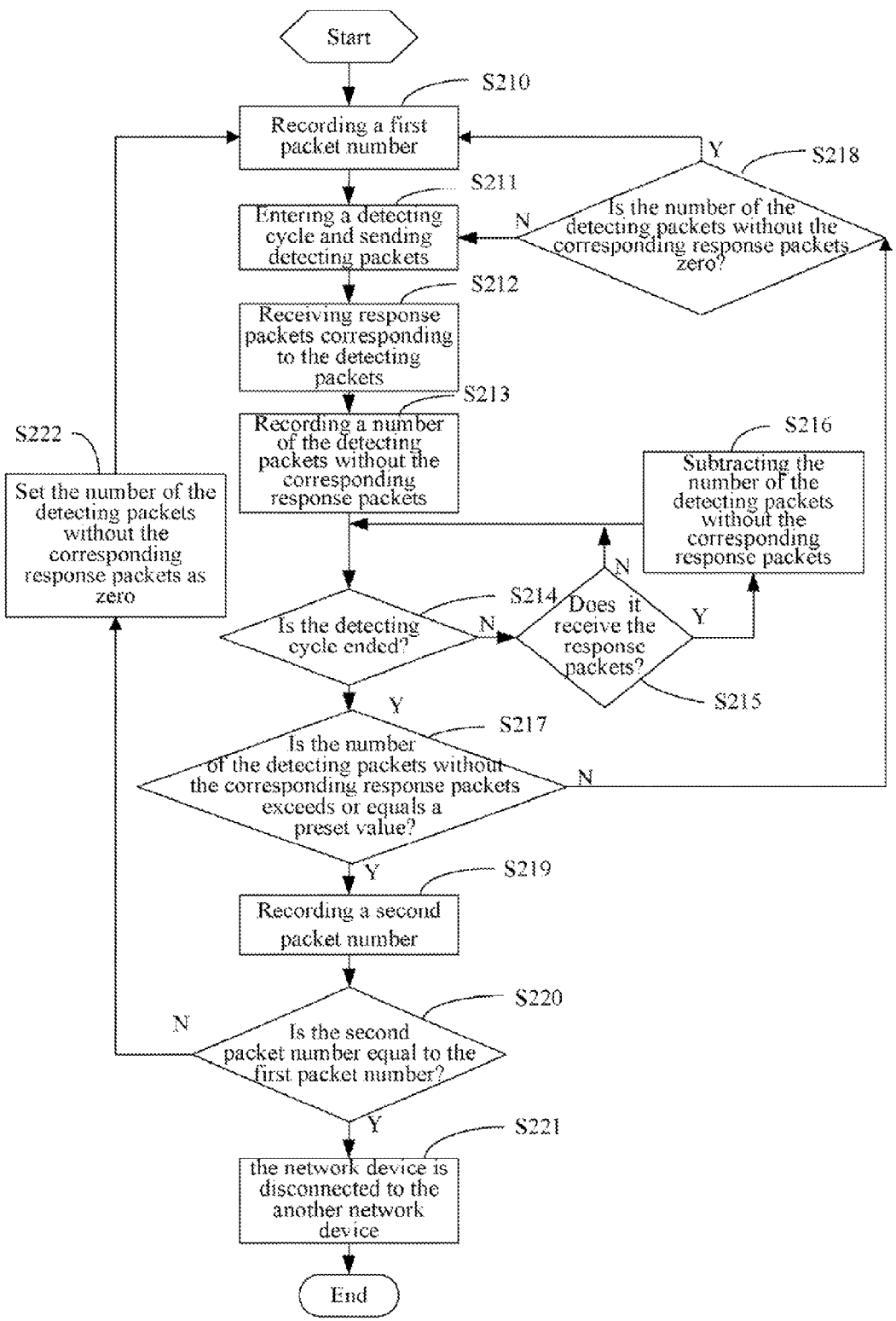
FIG. 2 is a flowchart of a method of connection detection in accordance with the present disclosure.

FIG. 2 is a flowchart of one embodiment of a method of connection detection in accordance with the present disclosure. The method is applied in a network device, such as that of FIG. 1, and is executed by functional modules such as those of FIG. 1. Depending on the embodiment, additional blocks may be added, others deleted, and the ordering of blocks may be changed while remaining well within the scope of the disclosure.

In one embodiment, the network device 10 communicates with the partner network device 20 by use of data packets according to PPP. The network device 10 implements detection of the connection if the need to determine the PPP connection exists.

In block S210, the recording module 110 records a first packet number. In one embodiment, the number of data packets recorded by the recording module 110 at the start of the detection cycle is defined as a first packet number. In one embodiment, the data packet is a normal packet used to communicate with the partner network device 20 by the network device 10 according to PPP. Recording module 110 records the number of data packets in the storage system 160 by a counter when the communication module 120 receives the data packets, so the number of data packets recorded by the recording module 110 at the beginning of a detection cycle is defined as a first packet number.

At the same time, in block S211, the communication module 120 sends detection packets to the partner network device 20. In one embodiment, the communication module 120 sends the detection packets to the partner network device 20 during the detection cycle, and the communication module 120 also receives the response packets from the partner network device 20 according to the LCP. In one embodiment, the detection packet is the LCP echo request, and the response packet is the LCP echo reply.

In block S212, the communication module 120 receives the response packets corresponding to the detection packets. In one embodiment, the communication module 120 receives no response packets due to instability of the network communication, nor does partner network device 20 receive the detection packets for the same reason.

In block S213, the recording module 110 records a number of the detection packets without corresponding response packets.

In block S214, the communication module 120 determines if the detection cycle is ended. In one embodiment, the detection cycle is a predetermined time, such as 3, 6, or 9 seconds.

If the detection cycle is not ended, in block S215, the communication module 120 determines if the network device 10 receives the response packets.

If the network device 10 receives the response packets, then in block S216, the recording module 110 subtracts the number of the detection packets without corresponding response packets. In one embodiment, once the communication module 120 sends the detection packets, the recording module 110 adds the number of the detection packets without corresponding response packets one by one, and once the communication module 120 receives the response packets, the recording module 110 subtracts the number of the detection packets without corresponding response packets one by one.

As soon as the recording module 110 subtracts the number of the detection packets without corresponding response packets, then in block S214, the communication module 120 continues to determine whether the detection cycle is ended.

If the communication module 120 does not receive the response packets, then the communication module 120 continues to determine whether the detection cycle is ended.

If the detection cycle is ended, then in block S217, the packet determination module 130 determines if the number of the detection packets without corresponding response packets exceeds or equals the preset value. In one embodiment, the network device 10 sets the preset value as a reference value in order to promptly detect the PPP connection between the network device 10 and the partner network device 20, and the preset value can be set as 3, for example.

If the packet determination module 130 determines that the number of the detection packets without corresponding response packets is less than the preset value, then in block S218, the packet determination module 130 determines if the number of the detection packets without corresponding response packets is equal to zero. The network device 10 and the partner network device 20 are connected if the number of the detection packets without corresponding response packets is equal to zero, and the network device 10 returns to block S210 and the recording module 110 restarts recording the first packet number. If the number of the detection packets without corresponding response packets is not equal to zero, then in block S211, the communication module 120 enters another detection cycle and continues to send the detection packets to the partner network device 20 to detect the connection.

If the packet determination module 130 determines that the number of the detection packets without corresponding response packets exceeds or equals the preset value, then in block S219, the recording module 110 records a second packet number. The second packet number indicates the number of data packets recorded by the recording module 110 when the packet determination module 130 determines the number of the detection packets without corresponding response packets exceeds or equals the preset value.

In block S220, the packet determination module 130 determines if the second packet number is equal to the first packet number.

If so, then in block S221, the determination module 140 determines that the network device 10 is disconnected from the partner network device 20.

If not, then in block S222, the determination module 140 determines that the network device 10 is connected from the partner network device 20, and the recording module 110 sets the number of the invalid number as zero, and the recording module 110 restarts recording of the first packet number.

As disclosed, the network device 10 and method of detecting the connection conveniently and precisely confirm the connection by way of the recording module 110, the communication module 120, the packet determination module 130, and the determination module 140. The network device 10 first determines if the detection cycle is ended, and then determines whether the communication module 120 receives the response packets corresponding to the detection packets, and the network device 10 determines the connection according to the number of data packets changed. The connection is conveniently and precisely detected, improving detection efficiency.

While various embodiments and methods of the present disclosure have been described above, it should be understood that they have been presented by way of example only and not by way of limitation. Thus, the breadth and scope of the present disclosure should not be limited by the above-described exemplary embodiments, but should be defined only in accordance with the following claims and their equivalents.

What is claimed is:

1. A network device to detect connection between the network device and a partner network device, the network device comprising a processor, a memory, and one or more programs, wherein the one or more programs are stored in the memory and operable to be executed by the processor, the programs comprising:
   a recording module operable to record a number of data packets transmitted between the network device and the partner network device, wherein the number of data packets recorded by the recording module at the beginning of a detection cycle, between the network device and the partner network device, is defined as a first packet number, and the number of data packets recorded at the conclusion of the detection cycle is defined as a second packet number;
   a communication module operable to transmit detection packets to the partner network device and receive response packets corresponding to the detection packets from the partner network device during the detection cycle, wherein the recording module is further operable to record a number of the detection packets without corresponding response packets;
   a packet determination module operable to determine if the number of the detection packets without corresponding response packets exceeds or equals a preset value at the end of the detection cycle, the recording module further to record the second packet number when the number of the detection packets without corresponding response packets exceeds or equals the preset value, and the packet determination module further to determine if the second packet number is equal to the first packet number when the number of the detection packets without corresponding response packets exceeds or equals the preset value; and
   a determination module operable to determine that the network device is disconnected from the partner network device when the second packet number is equal to the first packet number.

2. The network device as claimed in claim 1, wherein the packet determination module is further operable to determine that the network device is connected to the partner network device when the first packet number is not equal to the second packet number.

3. The network device as claimed in claim 1, wherein the communication module is operable to continuously receive the response packets during the detection cycle.

4. The network device as claimed in claim 3, wherein the recording module is further operable to subtract the number of the response packets received by the communication module from the number of the detection packets without corresponding response packets before the end of the detection cycle.

5. The network device as claimed in claim 1, wherein the packet determination module is further operable to determine if the number of the detection packets without corresponding response packets is zero when the number of the detection packets without corresponding response packets is less than the preset value.

6. The network device as claimed in claim 5, wherein the communication module is configured to start another detection cycle when the number of detection packets without corresponding response packets is not equal to zero.

7. A method of detecting connection between a network device and a partner network device, comprising:
   recording a first packet number, wherein a number of data packets recorded by the network device at the beginning of a detection cycle is defined as a first packet number;
   transmitting detection packets to the partner network device;
   receiving response packets corresponding to the detection packets from the partner network device in the detection cycle;
   recording a number of detection packets without corresponding response packets;
   determining if the number of the detection packets without corresponding response packets exceeds or equals a preset value at the conclusion of the detection cycle;
   recording a second packet number if the number of the detection packets without corresponding response packets exceeds or equals the preset value, wherein the second packet number indicates the number of data packets recorded by the network device when the number of the detection packets without corresponding response packets exceeds or equals the preset value;
   determining if the second packet number is equal to the first packet number; and
   determining that the network device is disconnected from the partner network device when the second packet number is equal to the first packet number.

8. The method as claimed in claim 7, wherein the method further comprises:
   determining that the network device is connected to the partner network device when the second packet number is not equal to the first packet number;
   setting the number of the detection packets without corresponding response packets as zero; and
   restarting to record the first packet number.

9. The method as claimed in claim 7, wherein the method further comprises:
   determining if the network device receives the response packets before the end of the detection cycle; and
   subtracting the number of the detection packets without corresponding response packets if the network device receives the response packets.

10. The method as claimed in claim 9, wherein the method further comprises:
    continuing to determine if the detection cycle is ended when the network device does not receive the response packets.

11. The method as claimed in claim 7, wherein the method further comprises:
    determining if the number of the detection packets without corresponding response packets is equal to zero when the number of the detection packets without corresponding response packets is less than the preset value; and
    restarting recording of the first packet number when the number of detection packets without corresponding response packets is equal to zero.

12. The method as claimed in claim 11, wherein the method further comprises:
  entering another detection cycle if the number of the detection packets without corresponding response packets is not equal to zero; and
  restarting recording of the first packet number when the number of the detection packets without corresponding response packets is equal to zero.

13. A network device to detect connection between the network device and a partner network device, the network device comprising a processor, a memory, and one or more programs, wherein the one or more programs are stored in the memory and operable to be executed by the processor, and the programs comprises:
  a recording module operable to record a first number of data packets transmitted between the network device and the partner network device at the beginning of a detection cycle;
  a communication module operable to transmit detection packets to the partner network device and receiving response packets corresponding to the detection packets from the partner network device during the detection cycle, wherein the recording module is further operable to record a number of the detection packets without corresponding response packets;
  a packet determination module operable to determine if the number of the detection packets without corresponding response packets exceeds or equals a preset value at the end of the detection cycle, wherein the recording module is further to operable to record a second packet number of data packets transmitted between the network device and the partner network device when the number of the detection packets without corresponding response packets exceeds or equals the preset value, and the packet determination module further to determine if the second packet number is equal to the first packet number of data packets if the number of the detection packets without corresponding response packets exceeds or equals the preset value; and
  a determination module operable to determine that the network device is disconnected from the partner network device when the second packet number is equal to the first packet number.

* * * * *